United States Patent
Tupinier et al.

(10) Patent No.: US 7,751,058 B2
(45) Date of Patent: Jul. 6, 2010

(54) OPTICAL ROTATION COUNTER

(75) Inventors: Laurent Tupinier, Reichstett (FR);
Olivier R. Marroux, Biard (FR);
Mandiaye Ndao, Strasbourg (FR);
Bernard Kress, Neubourg (FR)

(73) Assignee: Delphi Technologies, Inc., Troy, MI (US)

( * ) Notice: Subject to any disclaimer, the term of this patent is extended or adjusted under 35 U.S.C. 154(b) by 520 days.

(21) Appl. No.: 11/809,336

(22) Filed: May 31, 2007
(Under 37 CFR 1.47)

(65) Prior Publication Data
US 2008/0106995 A1    May 8, 2008

(30) Foreign Application Priority Data
May 31, 2006    (EP)    .................................. 06360024

(51) Int. Cl.
*G01B 11/02* (2006.01)
*G01B 9/02* (2006.01)
*G01D 5/34* (2006.01)
*G01D 5/36* (2006.01)

(52) U.S. Cl. .................. 356/499; 356/521; 250/231.18; 250/237 G

(58) Field of Classification Search .................. 356/488, 356/494, 499, 521; 250/237 G, 231.13–231.18
See application file for complete search history.

(56) References Cited

U.S. PATENT DOCUMENTS

| 4,218,615 | A | * | 8/1980 | Zinn, Jr. ................. 250/231.16 |
| 4,912,322 | A | * | 3/1990 | Ichikawa ................ 250/237 G |
| 4,930,895 | A | * | 6/1990 | Nishimura et al. .......... 356/494 |
| 4,975,570 | A | * | 12/1990 | Nishimura et al. ..... 250/231.16 |
| 5,073,710 | A | * | 12/1991 | Takagi et al. ........... 250/231.14 |
| 5,981,941 | A | * | 11/1999 | Takata et al. ........... 250/231.16 |
| 2004/0036016 | A1 | * | 2/2004 | Homer et al. .......... 250/231.13 |
| 2008/0087805 | A1 | * | 4/2008 | Kress ..................... 250/231.13 |
| 2008/0106995 | A1 | * | 5/2008 | Tupinier et al. ............. 369/103 |

FOREIGN PATENT DOCUMENTS

| DE | 198 55 064 | 5/2000 |
| JP | 57 203902 | 12/1982 |
| JP | 01 280215 | 11/1989 |

\* cited by examiner

*Primary Examiner*—Patrick J Connolly
(74) *Attorney, Agent, or Firm*—Jimmy L. Funke

(57) ABSTRACT

Optical rotation counter associated with a rotary disc of an angle sensor provided with means for coding the angular position of the disc, including at least one fixed source of coherent light emitting a light beam, a diaphragm and a support moved by the rotation of the coding disc. On its face facing the incident beam, the support includes at least one cell for coding its displacement orientated in the direction of the said displacement and generates an optical code by interference with the incident light beam, the said optical code being readable after interference on at least one photodetector.

15 Claims, 1 Drawing Sheet

OPTICAL ROTATION COUNTER

TECHNICAL FIELD

The present invention relates to an optical rotation counter associated with a rotary disc of an angle sensor provided with means for coding the angular position of the disc.

BACKGROUND OF THE INVENTION

The problem posed is as follows: in a certain number of applications, for example management of the rotation of a motor vehicle steering column, it is necessary to be able to code the position of the steering wheel absolutely over a plurality of rotations (approximately 5). Now, when angle sensors are used which only provide absolute coding of the angular position over one rotation, it remains to code the rotation in progress. This cannot involve a simple incremental rotation counter, as the precise position of the steering wheel must be precisely identified even at starting. Consequently, it is absolutely necessary to code the rotation in addition to the coding over 360°.

Solutions employed up to now use, for example, magnetic technologies associated with mechanical gearing solutions. The configurations employed are generally eccentric relative to the steering column, and must be so designed as to occupy little space, as the available under-wheel volume is small. It is therefore necessary to employ reducing gear trains and therefore to use mechanical systems requiring a certain precision, more expensive to manufacture and even assemble.

SUMMARY OF THE INVENTION

The present invention is proposed to remedy this disadvantage by using an optical solution associated with a counting mechanism.

The optical rotation counter of the invention, associated as mentioned above with a rotary disc of an angle sensor provided with means for coding the angular position of the disc, is principally characterised by the fact that it includes at least one fixed coherent light source emitting a light beam, a diaphragm and a support moved by the rotation of the coding disc, the said support including, on its face turned towards the incident beam, at least one cell for coding its displacement orientated in the direction of the said displacement and generating an optical code by interference with the incident light beam, the said optical code being readable after interference on at least one photodetector.

In fact, the rotation of the disc causes a displacement of controlled amplitude of the support, which includes means for coding its position permitting bijective correspondence with the rotation actually being effected by the rotary disc.

In accordance with one possibility, the coding cell or cells is (are) provided with a computer-generated hologram diffracting the incident beam into a digital optical code.

Alternatively, the said support can include a plurality of coding cells each presenting a grating with a specific motif.

In accordance with one version of the invention, the support in fact includes a number of cells corresponding to the number of rotations to be coded, each cell being covered by a hologram or specific grating generating optical coding corresponding to one rotation of the disc, the dimension of a coding cell permitting scanning by the incident beam during one complete rotation of the disc.

This configuration allows a particular code to be allocated to each rotation of the disc.

In accordance with a modification, the support can include a single coding cell provided with a hologram diffracting the incident light beam into an optical code composed of aligned spots, the said hologram including a modulation, in the form of one or more identical stripes arranged in parallel, which modulates the diffracted signal by changing the orientation of the line of spots depending on the relative position of the incident beam and the hologram, the said line always being perpendicular to the tangent to the stripe or stripes, the position of the centre of the diffraction spot of order 0 remaining unchanged, the said stripe or stripes being so orientated in the cell that an axial modification to the relative position of the incident light beam and the hologram modifies the orientation of the line of spots, a photodetector being so arranged as to correspond to the displacement of a diffraction spot.

In this case, there is only one hologram in a single coding cell, but with fine coding of the axial position which permits bijective correspondence of one rotation of the rotary disc with a set of positions.

Preferably, the photodetector is arranged in order to correspond to the displacement of a spot of order at least equal to 1 absolute.

Detection of the displacement of such a spot is much easier than that of the spot of order 0, which rotates on itself relative to the optical axis.

In accordance with one possibility, the stripe or stripes passing through the holograms is (are) an arc (arcs) of circle the radius(i) of which is (are) orientated substantially perpendicularly to the displacement of the support of the coding cell.

Under this hypothesis, the photodetector includes detection cells aligned in the direction of the displacement of the support. The light spots are displaced in an arc of circle at the same time as the normals to the stripes in arc of circle, which displacement is in fact assimilated to a rectilinear movement due to its limited amplitude.

In accordance with one possibility, the diaphragm situated on the path of the incident beam consists of a slot arranged radially relative to the rotary disc, and at least an end portion of which is arranged opposite the face including the axial coding cell or cells.

It is possible to optimize the design of the system as a whole, including the angle sensor, knowing that the angle coding can be effected by means of a circular track of angle coding cells, then arranging that the slot of the radially orientated collimation diaphragm extends so that the other end portion is situated opposite the said angle coding cells.

In this case, a single diaphragm serves to delimit the incident beam towards the different coding means.

Depending on the relative arrangement of the different components of the system, there may be a single coherent light source. Preferably, in practice this light source is a laser diode.

It may, however be envisaged that, if the slot forming the diaphragm is too elongate, a divider component separates the beam from the laser diode into two beams respectively directed towards the angle coding means of the disc and the means for coding the displacement of the support.

In accordance with one possibility, the support can be a rule actuated in translation by a gear or cam mechanism.

Alternatively, it may obviously also be a secondary disc, an angular sector, etc.

As mentioned above, in accordance with a preferred application the rotary disc of the angle sensor is in fact rigidly attached to a motor vehicle steering column.

BRIEF DESCRIPTION OF THE DRAWING

The invention will now be described in more detail, with reference to the single FIGURE which shows, in elevation, a rotary angle sensor disc rigidly attached to a steering column and provided with a rule to form the optical rotation counter of the invention.

DESCRIPTION OF THE PREFERRED EMBODIMENT

Figure 1:
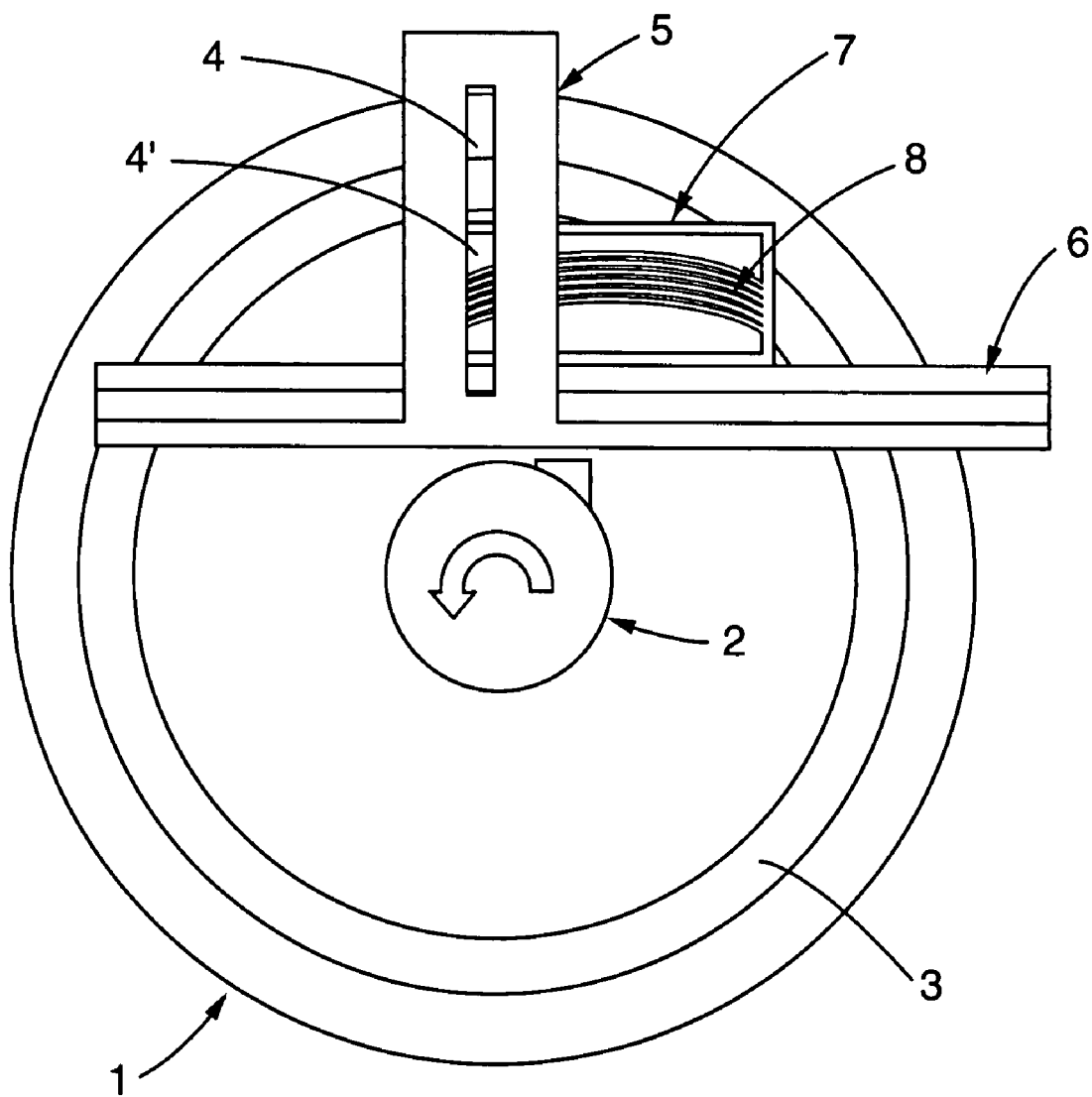

With reference to the FIGURE, the said rotation counter is associated with a rotary disc (1) rigidly attached to a steering column (2). This disc includes a track (3) covered with angle coding cells modulating an incident coherent light beam (4), collimated by a diaphragm (5).

A rule (6) is actuated in translation by a mechanical system (not shown) when the disc (1) rotates. This may involve for example gearing attached to the disc and meshing with a toothed longitudinal edge of the rule. In the example illustrated, this is provided with an axial coding cell (7) covered by a hologram changed by a modulation (8) in the form of multiple parallel stripes.

A second coherent light beam (4'), also collimated by the diaphragm (5), interferes with the axial coding cell (7). The optical code generated by the said hologram is an alignment of spots, modulated by the modulation (8). The said alignment changes orientation, depending on the relative position of the collimated incident beam (4') and the axial coding cell (7). It is in fact always perpendicular to the tangent to the stripe or stripes. Only the central diffraction spot of order 0 is unchanged throughout, turning about the optical axis.

A photodetector (not shown) is arranged in parallel with the axis of the rule (6). Its location is selected as a function of the positioning of a spot of the optical code of order greater than or equal to 1 absolute, the displacement of which has been selected for coding.

This spot is mobile, strictly speaking in an arc of circle, but which can be assimilated to a rectilinear displacement on the scale of the axial coding cell (7). The photodetector is orientated in the direction of the displacement of the said spot. Coding of the relative positioning of the collimated incident beam (4') and of the axial coding cell (7) is effected by reading of the illuminated detection cell or cells of the photodetector. These detection cells are aligned, and those which are activated correspond bijectively to a precise beam (4')/cell (7) relative position.

An also bijective correspondence can be established between a rotation which the disc (1) is effecting and the group of detection cells of the photodetector which can be illuminated during this rotation.

It is therefore possible, with the optical rotation counter shown in FIG. 1, to code one of a plurality of rotations performed by the disc (1).

There may be simultaneous implementation of axial coding and angular coding effected by interference of the light beam (4) with the track (3), which can for example be provided with diffraction coding cells generating absolute coding over one rotation. The distance between the rule (6) and the track (3) may justify the existence of two incident beams (4) and (4'). These may nevertheless come from a single laser diode, provided that there exists a divider component interposed between the said diode and the collimation diaphragm (5).

The example shown in FIG. 1 must not be considered as limiting to the invention, which also includes other possibilities such as mentioned above: the use of a plurality of axial coding cells, modification of the form of the modulation stripes, a support other than a rule, etc.

The invention claimed is:

1. An optical rotation counter associated with a rotary disc of an angle sensor provided with means for coding the angular position of the disc, said counter comprising: at least one fixed coherent light source emitting a light beam, a diaphragm and a support moved by the rotation of the coding disc, the said support including, on its face turned towards the incident beam, at least one cell for coding its displacement orientated in the direction of the said displacement and generating an optical code by interference with the incident light beam, the said optical code being readable after interference on at least one photodetector.

2. The optical rotation counter of claim 1, wherein the coding cell or cells is (are) provided with a computer-generated hologram diffracting the incident beam into a digital optical code.

3. The optical rotation counter of claim 1, wherein the support includes a plurality of coding cells each presenting a grating with a specific motif.

4. The optical rotation counter of claim 1, wherein the support includes a number of coding cells corresponding to the number of rotations to be coded, each cell being covered by a hologram or specific grating generating an optical coding corresponding to a rotation of the disc, the dimension of a coding cell permitting scanning by the incident beam during one complete rotation of the disc.

5. The optical rotation counter of claim 1, wherein the support includes a single coding cell provided with a hologram diffracting the incident light beam into an optical code composed of aligned spots, the said hologram including a modulation, in the form of one or more identical stripes arranged in parallel, which modulates the diffracted signal by changing the orientation of the line of spots according to the relative position of the incident beam and the hologram, the said line always being perpendicular to the tangent to the stripe or stripes, the position of the centre of the diffraction spot of order 0 remaining unchanged, the said stripe or stripes being so orientated in the cell that an axial modification to the relative position of the incident light beam and the hologram modifies the orientation of the line of spots, a photodetector being so arranged as to correspond to the displacement of a diffraction spot.

6. The optical rotation counter of claim 5, wherein the photodetector is arranged in order to correspond to the displacement of a spot of order at least equal to 1 absolute.

7. The optical rotation counter of claim 5, wherein the stripe of stripes passing through the holograms is (are) arc(s) of circle, the radius(i) of which is (are) orientated substantially perpendicularly to the direction of displacement of the support of the coding cell.

8. The optical rotation counter of claim 7, wherein the photodetector includes detection cells aligned in the direction of displacement of the support.

9. The optical rotation counter of claim 1, wherein the diaphragm positioned in the path of the incident beam consists of a slot arranged radially relative to the rotary disc, and at least an end portion of which is arranged opposite the face including the coding cell or cells.

10. The optical rotation counter of claim 9, wherein angular coding is performed using a circular track of angle coding cells, the slot in the radially orientated collimation diaphragm extending so that the other end portion of the slot is situated opposite the said angle coding cells.

11. The optical rotation counter of claim 1, wherein there is a single coherent light source.

12. The optical rotation counter of claim 11, wherein the coherent light source is a laser diode.

13. The optical rotation counter of claim 12, wherein a dividing component separates the beam from the laser diode into two beams respectively directed towards the angle coding means of the disc and the means for coding the displacement of the support.

14. The optical rotation counter of claim 13, wherein the support is a rule actuated in translation by a gear or cam mechanism.

15. The optical rotation counter of claim 1, wherein the rotary disc of the angle sensor is rigidly attached to a motor vehicle steering column.

* * * * *